(12) United States Patent
McIntosh et al.

(10) Patent No.: US 6,874,834 B2
(45) Date of Patent: Apr. 5, 2005

(54) LINEAR SLIDE GRIPPER

(75) Inventors: Bruce D. McIntosh, Monroeville, IN (US); Kenneth A. Steele, Fort Wayne, IN (US); William David Givens, Berne, IN (US); William E. Davenport, Fort Wayne, IN (US)

(73) Assignee: PHD, Inc., Fort Wayne, IN (US)

( * ) Notice: Subject to any disclaimer, the term of this patent is extended or adjusted under 35 U.S.C. 154(b) by 73 days.

(21) Appl. No.: 10/209,456

(22) Filed: Jul. 30, 2002

(65) Prior Publication Data

US 2003/0075941 A1 Apr. 24, 2003

Related U.S. Application Data

(63) Continuation-in-part of application No. 09/893,849, filed on Jun. 28, 2001, now Pat. No. 6,425,616, which is a continuation of application No. 09/767,527, filed on Jan. 23, 2001, now abandoned, which is a continuation of application No. 09/483,792, filed on Jan. 14, 2000, now Pat. No. 6,176,533, which is a division of application No. 08/981,863, filed on Aug. 4, 1998, now Pat. No. 6,048,013, application No. 10/209,456, which is a continuation-in-part of application No. 09/827,517, filed on Apr. 6, 2001, which is a continuation-in-part of application No. 09/767,527, filed on Jan. 23, 2001, which is a continuation of application No. 09/483,792, which is a division of application No. 09/981,863, application No. 10/209,456, which is a continuation-in-part of application No. 10/015,130, filed on Dec. 11, 2001, and a continuation-in-part of application No. 09/714,354, filed on Nov. 16, 2000, which is a continuation-in-part of application No. 09/483,794, filed on Jan. 14, 2000, now Pat. No. 6,227,586, which is a continuation of application No. 08/981,863, application No. 10/209,456, which is a continuation-in-part of application No. 09/199,957, filed on Nov. 25, 1998, now Pat. No. 6,056,281, which is a continuation-in-part of application No. 08/943,898, filed on Oct. 3, 1997, now Pat. No. 5,941,513, application No. 10/209,456, which is a continuation-in-part of application No. 09/765,010, filed on Jan. 18, 2001, now Pat. No. 6,302,462, which is a division of application No. 09/345,031, filed on Jun. 30, 1999, now Pat. No. 6,276,733, application No. 10/209,456, which is a continuation-in-part of application No. 09/991,033, filed on Nov. 21, 2001, which is a continuation of application No. 09/823,066, filed on Mar. 30, 2001, now Pat. No. 6,322,118, which is a continuation of application No. 09/345,031, filed on Jun. 30, 1999, now Pat. No. 6,276,733.

(60) Provisional application No. 60/354,776, filed on Feb. 5, 2002, provisional application No. 60/332,106, filed on Nov. 21, 2001, provisional application No. 60/333,254, filed on Nov. 6, 2001, provisional application No. 60/091,232, filed on Jun. 30, 1998, provisional application No. 60/039,088, filed on Mar. 14, 1997, and provisional application No. 60/027,668, filed on Oct. 7, 1996.

(51) Int. Cl.$^7$ ............................................. B25J 15/08
(52) U.S. Cl. .................. 294/88; 294/104; 294/907; 901/37; 901/46; 414/753.1
(58) Field of Search ..................... 294/88, 104, 106, 294/115, 907, 64.1; 269/30, 32, 34; 901/37, 46; 414/753.1

(56) References Cited

U.S. PATENT DOCUMENTS 229,670 A  7/1880 Carrick (Continued)

FOREIGN PATENT DOCUMENTS

DE        853091        8/1952

(Continued)

OTHER PUBLICATIONS

BTM Corportaion catalog page for Light–Weight, Fast Cycling, High Force Grippers, no date.

(Continued)

Primary Examiner—Dean J. Kramer
(74) Attorney, Agent, or Firm—Barnes & Thornburg LLP

(57) ABSTRACT

A linear slide gripper assembly is provided having a linear slide assembly coupled to a gripper assembly. The linear slide assembly has extension and retraction ports in fluid communication with a fluid source to move the gripper assembly between extended and retracted positions. The gripper assembly is in fluid communication with the linear slide assembly to selectively actuate.

33 Claims, 10 Drawing Sheets

U.S. PATENT DOCUMENTS

| | | |
|---|---|---|
| 276,678 A | 5/1883 | Fowler |
| 294,736 A | 3/1884 | Hyle |
| 300,140 A | 6/1884 | Schlumm et al. |
| 320,436 A | 6/1885 | Hock |
| 377,114 A | 1/1888 | Pague |
| 490,150 A | 1/1893 | Low |
| 659,532 A | 10/1900 | Jordon |
| 669,358 A | 5/1901 | Wilson |
| 688,230 A | 12/1901 | Isgrig et al. |
| 746,360 A | 12/1903 | McAdams |
| 906,507 A | 12/1908 | Canedy |
| 1,007,824 A | 11/1911 | Trosper |
| 1,468,110 A | 9/1923 | Howe |
| 1,472,566 A | 10/1923 | Oishei |
| 1,494,033 A | 5/1924 | Stevens |
| 1,519,736 A | 12/1924 | Lewis |
| 1,543,037 A | 6/1925 | Teeter |
| 1,590,227 A | 6/1926 | Britton |
| 1,640,883 A | 8/1927 | Coleman |
| 1,929,361 A | 10/1933 | Liljebladh |
| 1,929,807 A | 10/1933 | Casper |
| 1,940,258 A | 12/1933 | Lautz |
| 1,955,226 A | 4/1934 | Chavannes |
| 1,986,149 A | 1/1935 | Harris |
| 1,987,987 A | 1/1935 | Bohmbach |
| 2,081,749 A | 5/1937 | Kritzler et al. |
| 2,141,945 A | 12/1938 | Tweedale |
| 2,168,988 A | 8/1939 | Hulquist |
| 2,188,514 A | 1/1940 | Moore |
| 2,198,623 A | 4/1940 | Kastler |
| 2,212,156 A | 8/1940 | Erdley |
| 2,295,051 A | 9/1942 | Roth |
| 2,326,962 A | 8/1943 | Meier |
| 2,367,252 A | 1/1945 | Williams |
| 2,381,657 A | 8/1945 | Eksergian et al. |
| 2,452,406 A | 10/1948 | Volkery et al. |
| 2,469,542 A | 5/1949 | Becker |
| 2,476,169 A | 7/1949 | White et al. |
| 2,492,558 A | 12/1949 | Deubler, Jr. |
| 2,499,136 A | 2/1950 | Edlund et al. |
| 2,565,793 A | 8/1951 | Weismantel |
| 2,609,113 A | 9/1952 | Huffman |
| 2,651,026 A | 9/1953 | Roth |
| 2,701,492 A | 2/1955 | Johnson |
| 2,769,895 A | 11/1956 | Boord |
| 2,776,168 A | 1/1957 | Schweda |
| 2,791,623 A | 5/1957 | Lock et al. |
| 2,786,787 A | 6/1957 | Aske |
| 2,825,601 A | 3/1958 | Doty |
| 2,828,998 A | 4/1958 | Seelye |
| 2,853,905 A | 9/1958 | Reisacher et al. |
| 2,858,522 A | 10/1958 | Wengen et al. |
| 2,919,925 A | 1/1960 | Snyder et al. |
| 2,948,172 A | 8/1960 | Sloboda et al. |
| 3,013,835 A | 12/1961 | Blatt |
| 3,061,357 A | 10/1962 | Wright |
| 3,120,847 A | 2/1964 | Cavaness |
| 3,146,982 A | 9/1964 | Budnick |
| 3,209,753 A | 10/1965 | Hawkins et al. |
| 3,317,235 A | 5/1967 | Botten |
| 3,349,927 A | 10/1967 | Blatt |
| 3,350,132 A | 10/1967 | Ashton |
| 3,400,836 A | 9/1968 | Bende |
| 3,482,830 A | 12/1969 | Sendoykas |
| 3,519,188 A | 7/1970 | Erhardt, Jr. |
| 3,568,959 A | 3/1971 | Blatt |
| 3,572,519 A | 3/1971 | Tezuka |
| 3,599,468 A | 8/1971 | Alcock |
| 3,606,443 A | 9/1971 | Painter et al. |
| 3,613,904 A | 10/1971 | Blatt |
| 3,635,514 A | 1/1972 | Blatt |
| 3,664,654 A | 5/1972 | Manville |
| 3,677,584 A | 7/1972 | Short |
| 3,712,415 A | 1/1973 | Blatt et al. |
| 3,714,870 A | 2/1973 | Blatt |
| 3,734,303 A | 5/1973 | Blatt |
| 3,734,556 A | 5/1973 | Misawa |
| 3,759,563 A | 9/1973 | Kitamura |
| 3,765,545 A | 10/1973 | Iwata |
| 3,778,094 A | 12/1973 | Grolet et al. |
| D230,826 S | 3/1974 | Menshen |
| 3,804,397 A * | 4/1974 | Neumann .................... 269/21 |
| 3,817,282 A | 6/1974 | Peters |
| 3,840,128 A | 10/1974 | Swoboda, Jr. |
| 3,865,424 A | 2/1975 | Jabkowski |
| 3,866,966 A | 2/1975 | Skinner, II |
| 3,920,295 A | 11/1975 | Speckin |
| 3,921,820 A | 11/1975 | Crockett |
| 3,934,915 A | 1/1976 | Humpa |
| 3,975,068 A | 8/1976 | Speckin |
| 4,024,870 A | 5/1977 | Sandel |
| 4,072,236 A | 2/1978 | Nomura et al. |
| 4,106,646 A | 8/1978 | Weisgerber |
| 4,109,953 A | 8/1978 | Seymour |
| 4,167,996 A | 9/1979 | Cutter |
| 4,209,280 A | 6/1980 | Bittner |
| 4,234,223 A | 11/1980 | O'Neil |
| 4,275,872 A | 6/1981 | Mullis |
| 4,286,620 A | 9/1981 | Turney |
| 4,291,909 A | 9/1981 | Coatantiec |
| 4,305,692 A | 12/1981 | Brauer |
| 4,307,864 A | 12/1981 | Benoit |
| 4,355,922 A | 10/1982 | Sato |
| 4,363,475 A | 12/1982 | McCarty |
| 4,365,928 A | 12/1982 | Baily |
| 4,382,572 A | 5/1983 | Thompson |
| 4,403,801 A | 9/1983 | Huff et al. |
| 4,439,092 A * | 3/1984 | Ajisaka .................... 414/752.1 |
| 4,448,405 A | 5/1984 | Cipolla |
| 4,453,755 A | 6/1984 | Blatt |
| 4,462,581 A | 7/1984 | Mitani |
| 4,463,635 A | 8/1984 | Hafla et al. |
| 4,473,249 A | 9/1984 | Valentine et al. |
| 4,475,607 A | 10/1984 | Haney |
| 4,480,497 A | 11/1984 | Locher |
| 4,484,775 A | 11/1984 | Norkus |
| 4,495,834 A | 1/1985 | Bauer et al. |
| 4,507,045 A * | 3/1985 | Valentine et al. ......... 414/753.1 |
| 4,515,336 A | 5/1985 | Fischer |
| 4,519,279 A | 5/1985 | Ruggeri |
| 4,529,182 A | 7/1985 | Valentine |
| 4,596,415 A | 6/1986 | Blatt |
| 4,600,357 A | 7/1986 | Coules |
| 4,605,354 A | 8/1986 | Daly |
| 4,610,475 A | 9/1986 | Heiserman |
| 4,626,014 A | 12/1986 | Vredenbregt et al. |
| 4,627,779 A | 12/1986 | Cucchi et al. |
| 4,635,638 A | 1/1987 | Weintraub et al. |
| 4,647,097 A | 3/1987 | Lessway |
| 4,650,235 A | 3/1987 | Shaginian et al. |
| 4,650,237 A | 3/1987 | Lessway |
| 4,697,838 A * | 10/1987 | Hartman ...................... 294/88 |
| 4,703,968 A | 11/1987 | LaBounty |
| 4,708,297 A | 11/1987 | Boers |
| 4,717,189 A | 1/1988 | Gabriel |
| 4,723,503 A | 2/1988 | Yuda |
| 4,730,861 A | 3/1988 | Spencer |
| 4,736,971 A | 4/1988 | McManus |
| D296,546 S | 7/1988 | Sachs |
| 4,768,821 A | 9/1988 | Hucul et al. |
| 4,805,938 A | 2/1989 | Redmond et al. |

| | | |
|---|---|---|
| 4,821,719 A | 4/1989 | Fogarty |
| 4,886,635 A | 12/1989 | Forster et al. |
| 4,930,538 A | 6/1990 | Browne |
| 4,941,481 A | 7/1990 | Wagenknecht |
| 4,957,318 A | 9/1990 | Blatt |
| 4,969,638 A | 11/1990 | Yang |
| 4,980,626 A | 12/1990 | Hess et al. |
| 5,004,284 A | 4/1991 | Boaz |
| 5,016,850 A | 5/1991 | Plahn |
| 5,056,845 A | 10/1991 | Cook |
| 5,062,756 A | 11/1991 | McArthur et al. |
| 5,069,433 A | 12/1991 | Womack |
| 5,078,440 A | 1/1992 | Taniguchi |
| 5,085,480 A | 2/1992 | Jackson |
| 5,090,757 A | 2/1992 | Huber et al. |
| 5,108,140 A | 4/1992 | Bartholet |
| 5,125,709 A | 6/1992 | Meier, Jr. |
| 5,131,705 A | 7/1992 | Glück et al. |
| 5,143,359 A | 9/1992 | Bush |
| RE34,120 E | 11/1992 | Plahn |
| 5,163,804 A | 11/1992 | Kobayashi |
| 5,172,950 A | 12/1992 | Benecke |
| 5,172,951 A | 12/1992 | Jacobsen et al. |
| 5,178,431 A | 1/1993 | Voellmer |
| 5,188,579 A | 2/1993 | Rüschle et al. |
| 5,192,058 A | 3/1993 | VanDalsem et al. |
| 5,222,778 A | 6/1993 | Moench |
| 5,240,040 A | 8/1993 | Barnum et al. |
| 5,242,202 A | 9/1993 | Ettinger |
| 5,248,177 A | 9/1993 | Jones et al. |
| 5,253,911 A | 10/1993 | Egan et al. |
| 5,253,912 A | 10/1993 | Andorlini et al. |
| 5,261,715 A | 11/1993 | Blatt et al. |
| 5,271,651 A | 12/1993 | Blatt et al. |
| 5,280,981 A | 1/1994 | Schulz |
| 5,284,375 A | 2/1994 | Land, III |
| 5,291,914 A | 3/1994 | Bares et al. |
| 5,299,847 A | 4/1994 | Blatt et al. |
| 5,328,222 A | 7/1994 | Sartorio et al. |
| 5,328,224 A | 7/1994 | Jacobsen et al. |
| 5,335,955 A | 8/1994 | Pekka et al. |
| 5,364,146 A | 11/1994 | Brandorff et al. |
| 5,397,159 A | 3/1995 | Sartorio et al. |
| 5,417,464 A | 5/1995 | Seaberg et al. |
| 5,503,378 A | 4/1996 | Schauss et al. |
| 5,516,173 A | 5/1996 | Sawdon |
| 5,536,133 A | 7/1996 | Velez et al. |
| 5,570,920 A | 11/1996 | Crisman et al. |
| 5,588,688 A | 12/1996 | Jacobsen et al. |
| 5,647,625 A | 7/1997 | Sawdon |
| 5,762,390 A | 6/1998 | Gosselin et al. |
| 5,853,211 A | 12/1998 | Sawdon et al. |
| 5,871,250 A | 2/1999 | Sawdon |
| 5,938,259 A | 8/1999 | Sawdon et al. |
| 5,996,614 A | 12/1999 | Ashton |
| 6,079,896 A | 6/2000 | Dellach |
| 6,099,539 A | 8/2000 | Howell et al. |
| 6,176,533 B1 | 1/2001 | Moilanen et al. |
| 6,378,855 B1 | 4/2002 | Sawdon et al. |
| 6,378,856 B1 | 4/2002 | Takahashi |

FOREIGN PATENT DOCUMENTS

| | | |
|---|---|---|
| DE | 27-22-689 A1 | 11/1978 |
| EP | 0-857-547 A1 | 8/1998 |
| GB | 2 041 263 A | 9/1980 |
| SU | 1342860 A1 | 10/1987 |

OTHER PUBLICATIONS

ISI Norgren Brochure, Parallel Motion Jaw—O.D. Gripper Head and Jaws Without Gripping Fingers, p. 6, no date.

ISI–APG Brochure page, Mau2, Mini Pneumatic Actuating Unit, no date.

* cited by examiner

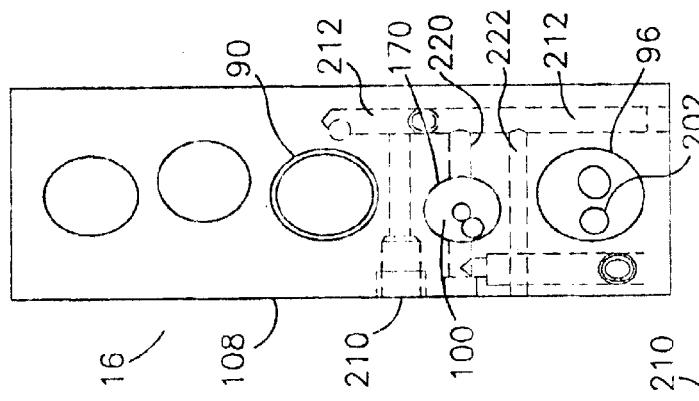
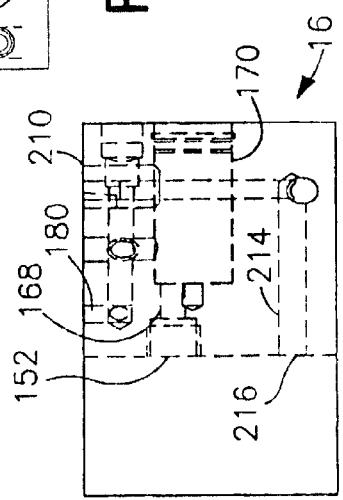
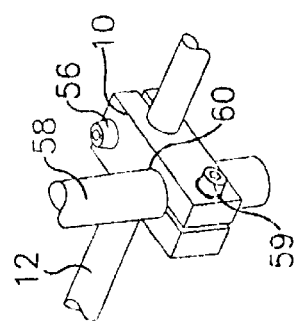
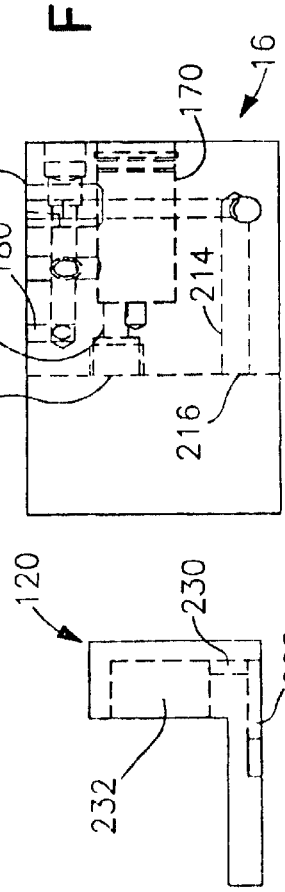

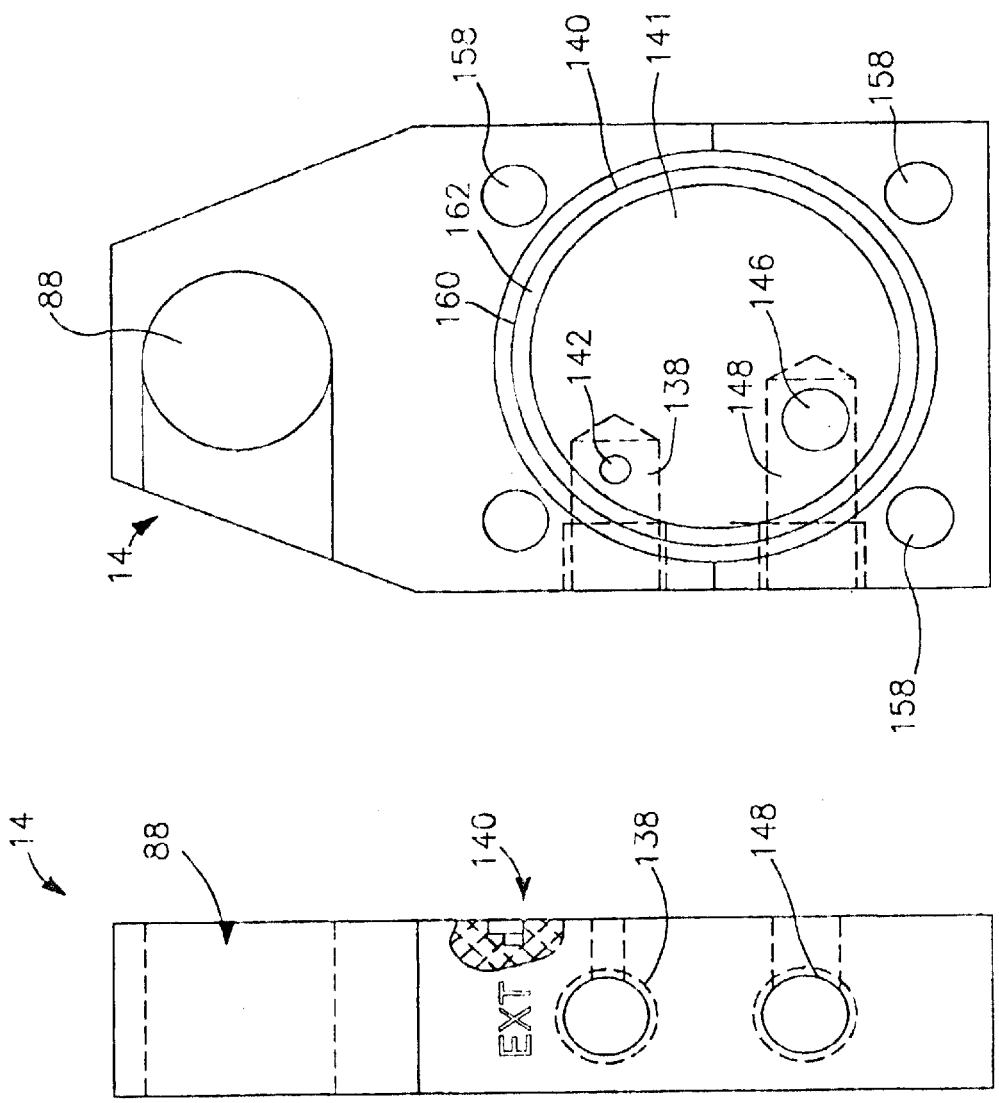

LINEAR SLIDE GRIPPER

RELATED APPLICATIONS

The present application is related to and claims priority to U.S. Provisional Patent Application Ser. No. 60/333,254 (filed Nov. 6, 2001), U.S. Provisional Patent Application Ser. No. 60/332,106 (filed Nov. 21, 2001), U.S. Provisional Patent Application Ser. No. 60/354,225 (filed Feb. 4, 2002), and U.S. Provisional Patent Application Ser. No. 60/354,776 (filed Feb. 5, 2002) all of which are entitled Linear Slide Gripper. The present application is also a Continuation-in-Part of U.S. patent application Ser. No. 09/893,849 (filed Jun. 28, 2001), now U.S. Pat. No. 6,425,616), which is a Continuation of U.S. patent application Ser. No. 09/767,527 (filed on Jan. 23, 2001, which was abandoned in favor of U.S. patent application Ser. No. 09/893,849), which is a Continuation of Ser. No. 09/483,792 (filed on Jan. 14, 2000), now U.S. Pat. No. 6,176,533, which is a Divisional application of U.S. patent application Ser. No. 08/981,863 (filed on Aug. 4, 1998), now U.S. Pat. No. 6,048,013, which is related to and claims priority to U.S. Provisional Patent Application Ser. No. 60/027,668 (filed Oct. 7, 1996) and U.S. Provisional Patent Application Ser. No. 60/039,088 (filed Mar. 14, 1997). The present application is further related to and claims priority as a Continuation-in-Part of U.S. patent application Ser. No. 09/827,517 (filed Apr. 6, 2001), which is a Continuation-in-Part of U.S. patent application Ser. No. 09/767,527 (filed on Jan. 23, 2001, which was abandoned in favor of U.S. patent application Ser. No. 09/893,849 (filed on Jun. 28, 2001)), which is a Continuation of Ser. No. 09/483,792 (filed on Jan. 14, 2000), now U.S. Pat. No. 6,176,533, which is a Divisional application of U.S. patent application Ser. No. 08/981,863 (filed on Aug. 4, 1998), now U.S. Pat. No. 6,048,013, which is related to and claims priority to U.S. Provisional Patent Application Ser. No. 60/027,668 (filed Oct. 7, 1996) and U.S. Provisional Patent Application Ser. No. 60/039,088 (filed Mar. 14, 1997). The present application is further related to and claims priority as a Continuation-in-Part of U.S. Patent Application Ser. No. 10/015130 (filed Dec. 11, 2001). The present application is also related to and claims priority as a Continuation-in-Part of U.S. patent application Ser. No. 09/714,354 (filed Nov. 16, 2000), which is a Continuation-in-Part of U.S. patent application Ser. No. 09/483,794 (filed on Jan. 14, 2000), now U.S. Pat. No. 6,227,586, which is a Continuation application of U.S. patent application Ser. No. 08/981,863 (filed on Aug. 4, 1998), now U.S. Pat. No. 6,048,013, which is related to and claims priority to U.S. Provisional Patent Application Ser. No. 60/027,668 (filed Oct. 7, 1996) and U.S. Provisional Patent Application Ser. No. 60/039,088 (filed Mar. 14, 1997). The present application is further related to and claims priority as a Continuation-in-Part of U.S. patent application Ser. No. 09/199,957 (filed Nov. 25, 1998) now U.S. Pat. No. 6,056,281, which is a Continuation-in-Part of U.S. patent application Ser. No. 08/943,898 (filed on Oct. 3, 1997), now U.S. Pat. No. 5,941,513, which is related to and claims priority to U.S. Provisional Patent Application Ser. No. 60/027,668 (filed Oct. 7, 1996). The present application is further related to and claims priority as a Continuation-in-Part of U.S. patent application Ser. No. 09/765,010 (filed on Jan. 18, 2001), now U.S. Pat. No. 6,302,462, which is a Divisional of U.S. patent application Ser. No. 09/345,031 (filed on Jun. 30, 1999), now U.S. Pat. No. 6,276,733, which is related to and claims priority to U.S. Provisional Patent Application Ser. No. 60/091,232 (filed Jun. 30, 1998). The present application is further related to and claims priority as a Continuation-in-Part of U.S. patent application Ser. No. 09/991,033 (filed on Nov. 21, 2001), which is a Continuation of U.S. patent application Ser. No. 09/823,066 (filed on Mar. 30, 2001), now U.S. Pat. No. 6,322,118, which is a Continuation of U.S. patent application Ser. No. 09/345,031 (filed on Jun. 30, 1999), now U.S. Pat. No. 6,276,733, which is related to and claims priority to U.S. Provisional Patent Application Ser. No. 60/091,232 (filed Jun. 30, 1998). To the extent not included below, the subject matter disclosed in these applications is hereby expressly incorporated into the present application.

TECHNICAL FIELD

The present disclosure relates to fluid pressure actuated grippers of the type employed in automated workpiece handling devices which clampingly grip and transfer a workpiece from one location to another. More particularly, the present disclosure relates to such fluid pressure actuated grippers that can be extended and retracted from a location to handle a workpiece.

BACKGROUND AND SUMMARY

Actuating gripper assemblies that extend to grip a workpiece are known in the art. Typically, such devices have a gripper assembly attached to a pneumatic extension mechanism that extends the gripper which then grips the workpiece at some distance away to have an operation performed thereon. After the desired operation is conducted to the workpiece the gripper's jaws can be opened and the gripper assembly retracted to its original position. The timing mechanism used on such devices to achieve this result is a common piston rod that actuates both the extension mechanism and the gripper jaws.

It would, thus, be beneficial to provide a linear slide gripper assembly that does not require a common piston rod to actuate both the extension and gripper mechanisms.

Accordingly, the following disclosure provides a linear slide gripper assembly comprising a linear slide assembly and a gripper assembly. The linear slide assembly comprises a slide having first and second receiving ports, both in fluid communication with a fluid source, to move the linear slide portion between extended and retracted positions. In addition, the linear slide assembly comprises a valve assembly having a check valve located within a cavity, wherein both the first and second receiving ports are in communication with the check valve, and each direct a portion of the fluid through the valve and into the cavity. The linear slide assembly further comprises a switch assembly having a chamber that is in fluid communication with the cavity wherein upon activation of the switch the chamber becomes in selective communication with first and second conduits. The linear slide assembly also comprises a trip coupled to and movable with the slide wherein movement of the slide causes the trip to activate the switch to release fluid from the switch assembly. The gripper assembly comprises an actuator that is in fluid communication with the first and second conduits to receive the fluid released from the switch assembly to power the actuator. The gripper assembly also comprises a plurality of gripper arms coupled to the gripper assembly wherein the actuator is engagable with at least one of the arms to move same when the actuator is powered by the fluid from the switch.

Other illustrative embodiments of the linear slide gripper assembly may comprise: as the slide moves to a first position, the trip activates the switch which causes fluid in the chamber of the switch to be directed through the first conduit to power the actuator of the gripper assembly to move the at least one jaw arm; the slide being movable from the first position to a second position such that the trip reactivates the switch to cause the fluid from the chamber of the switch to power the actuator of the gripper assembly to move the at least one jaw arm again; the switch further comprising a resilient member that is compressible such that in a compressed state the switch is reactivated; the second receiving port being in fluid communication with a valve actuator that exerts a force on the switch and against the trip thereby compressing the resilient member to reactivate the switch to release fluid from the chamber to the gripper assembly and move the at least one gripper jaw in the second direction.

Another illustrative embodiment of the linear slide gripper assembly comprises a linear slide assembly, a valve assembly and a fluid actuated gripper assembly. The linear slide assembly has a fluid passage configured to receive fluid from a fluid source, and comprises a slide member in fluid communication with the fluid passage to move the slide member. The valve assembly is in fluid communication with the fluid passage. The fluid actuated gripper assembly is attached to and is movable with the slide member. The fluid actuated gripper assembly also comprises an actuator that is in fluid communication with the valve assembly, wherein the valve assembly selectively directs fluid from the fluid passage of the linear slide assembly to the actuator, and at least one jaw member that is powered by the actuator to selectively move the at least one jaw member relative to the gripper assembly.

Other illustrative embodiments of the linear slide gripper assembly may comprise the linear slide assembly further comprising an extension passage configured to receive fluid from the fluid source; the slide member being in fluid communication with the fluid from the extension passage to move the slide member; the linear slide assembly further comprising a retraction passage configured to receive fluid from the fluid source; the slide member being in fluid communication with the fluid from the retraction passage to move the slide member; and the slide member being movable between extended and retracted positions when fluid from the fluid source is selectively delivered to extension and retraction passages.

Another illustrative embodiment of the linear slide gripper assembly again comprises a linear slide assembly and a fluid actuated gripper assembly. The linear slide assembly in this embodiment comprises a slide member, a valve, and a fluid passage assembly. The fluid passage assembly is configured to receive fluid from a fluid source. The fluid passage assembly also has a distribution port that directs the fluid to the movable slide, and directs the fluid to the valve wherein force from the fluid moves the slide member in a first direction. The fluid actuated gripper assembly is coupled to the slide member wherein the fluid actuated gripper assembly comprises an actuator and at least one jaw member. The actuator is in fluid communication with the switch wherein the switch selectively delivers fluid to the actuator. The at least one jaw member is powered by the actuator to selectively move the at least one jaw member relative to the gripper assembly.

Other illustrative embodiments of the linear slide gripper assembly may comprise the switch being activated by movement of the slide member; the valve being located in a valve cavity where the fluid is collected; activation of the switch delivers fluid from the fluid cavity to the actuator; movement of the slide member in the first direction being an extending direction; further comprising a trip member coupled to the slide member such that movement of the slide member in the extending direction causes the trip member to engage the switch to activate same to deliver fluid from the fluid cavity to the actuator; wherein the fluid passage assembly being an extension fluid passage assembly; wherein the linear slide assembly further comprises a retraction fluid passage assembly configured to receive fluid from the fluid source, wherein, the retraction fluid passage assembly having a distribution port that directs the fluid to the movable slide and directs the fluid to the valve, wherein force from the fluid moves the slide member in a retracting direction, and wherein movement of the slide member in the retracting direction causes the switch to activate to deliver fluid from the fluid cavity to the actuator; wherein activation of the switch from movement of the slide member in the retracting direction to cause the at least one jaw arm of the actuated gripper assembly to move; activation of the switch from movement of the slide member in the extending direction delivers fluid to the actuator to close the at least one jaw member, and activation of the switch from movement of the slide member in the retracting direction delivers fluid to the actuator to open the at least one jaw member.

Another illustrative embodiment of the linear slide gripper assembly comprises a linear slide portion and a gripper assembly. The linear slide portion having extension and retraction ports both in fluid communication with a fluid source to move the linear slide portion between extended and retracted positions, respectively. The extension and retraction ports each direct a portion of the fluid to a valve. The gripper assembly is in fluid communication with the fluid from the valve, wherein the fluid from the valve actuates the gripper assembly.

Other illustrative embodiments of the linear slide gripper assembly may comprise the valve being located in a space that collects fluid that is deposited from the extension and retraction ports; the space being in communication with a switch assembly that is in fluid communication with the gripper assembly such that activation of the switch transfers fluid collected in the space to gripper assembly; movement of the linear slide portion activates the switch; activation of the switch delivers fluid from the space to the gripper assembly; fluid supplied to the extension port directs the portion of the fluid through the valve and into the space such that movement of the linear slide portion engages the switch to deliver fluid from the space to the gripper assembly; fluid supplied to the retraction port directs the portion of the fluid through the valve and into the space such that movement of the linear slide portion engages the switch to deliver fluid from the space to the gripper assembly; delivery of the fluid to the gripper assembly causes the gripper assembly to close; delivery of the fluid to the gripper assembly causes the gripper assembly to open; the gripper assembly being semi-spherically movable relative the linear slide portion; the valve is a dual check valve that receives fluid from both the extension and retraction ports; and the switch being a pressure switch comprising a first chamber that receives fluid from the space and a second chamber that receives fluid from the space upon activation of the switch.

Additional features and advantages of the linear slide gripper assembly will become apparent to those skilled in the art upon consideration of the following detailed description of the illustrated embodiment exemplifying the best mode of carrying out the linear slide gripper assembly as presently perceived.

BRIEF DESCRIPTION OF DRAWINGS

The present disclosure will be described hereafter with reference to the attached drawings which are given as non-limiting examples only, in which:

FIG. 10 is a perspective detail view of a portion of the linear slide gripper assembly of FIG. 1;

FIGS. 11A and B are side and front views, respectively, of the cap portion of the linear slide gripper assembly of FIG. 1;

FIG. 14 is a top view of a valve body portion of the linear slide gripper assembly of FIG. 1, showing the inner detail of the valve body portion in phantom;

Figure 1:
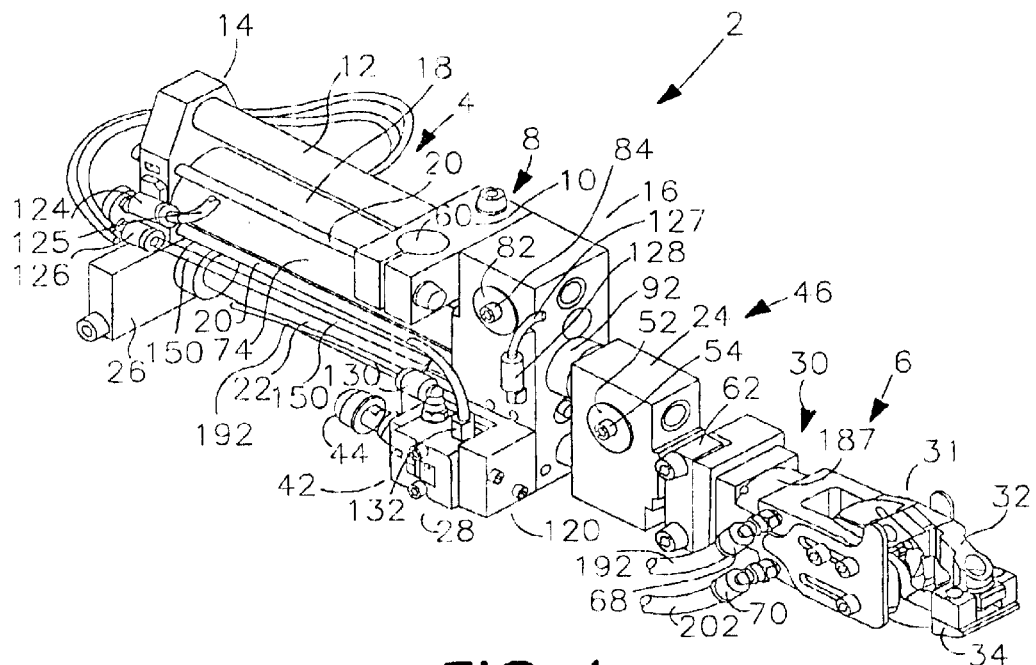
FIG. 1 is a perspective view of a linear slide gripper assembly according to the present disclosure.

Corresponding reference characters indicate corresponding parts throughout the several views. The exemplification set out herein illustrates embodiments of the linear slide gripper assembly, and such exemplification is not to be construed as limiting the scope of the linear slide gripper assembly in any manner.

DETAILED DESCRIPTION OF THE DRAWINGS

An illustrative embodiment of a linear slide gripper assembly 2 is shown in FIG. 1. This illustrative embodiment of the linear slide assembly 2 comprises a linear slide assembly 4 and a gripper assembly 6. The slide assembly 4 extends slide assembly 6 some distance from its retracted position. The gripper assembly 6, one illustrative embodiment of which is disclosed in U.S. Pat. No. 6,048,013, previously incorporated herein by reference, is configured to grip and release a workpiece while extended to any desired distance.

Slide assembly 4 comprises a mounting assembly 8 for coupling assembly 2 to any work handling device (not shown). In the illustrated embodiment, the slide assembly 2 has a mount block 10 which is adjustably disposed on a mounting tube 12 that extends between cap 14 and housing 16, allowing positional adjustability of the linear slide assembly 2 relative to the work handling device. Piston rod assembly 18, along with its associated tie bars 20, extends between cap 14 and housing 16 as well. An extension rod 22 also extends between cap 14 and housing 16. In the illustrative embodiment, extension rod 22 is attached to mounting block 24, disposed through bore 96 of housing 16, and movable relative thereto. (See FIG. 12D.) Mounting block 24 is illustratively positioned between the slide assembly 4 and the gripper assembly 6. In the illustrated embodiment, a block 26 is attached to extension rod 22 and is configured to engage switch assembly 28, thereby activating same to activate gripper assembly 6.

Gripper assembly 6 is attached to slide assembly 4 via mounting bracket 30 that is illustratively attached to mounting block 24. In the illustrated embodiment, mounting block 24 provides adjustability of gripper assembly 6, as discussed further herein. The illustrated gripper assembly 6 comprises a fluid actuated gripper 31, having pivotable jaw members 32, 34. Again, it is appreciated that grippers of any type and of any number of moveable jaws may be used in place of the specific gripper 31 shown in the illustrated embodiment.

Figure 2:
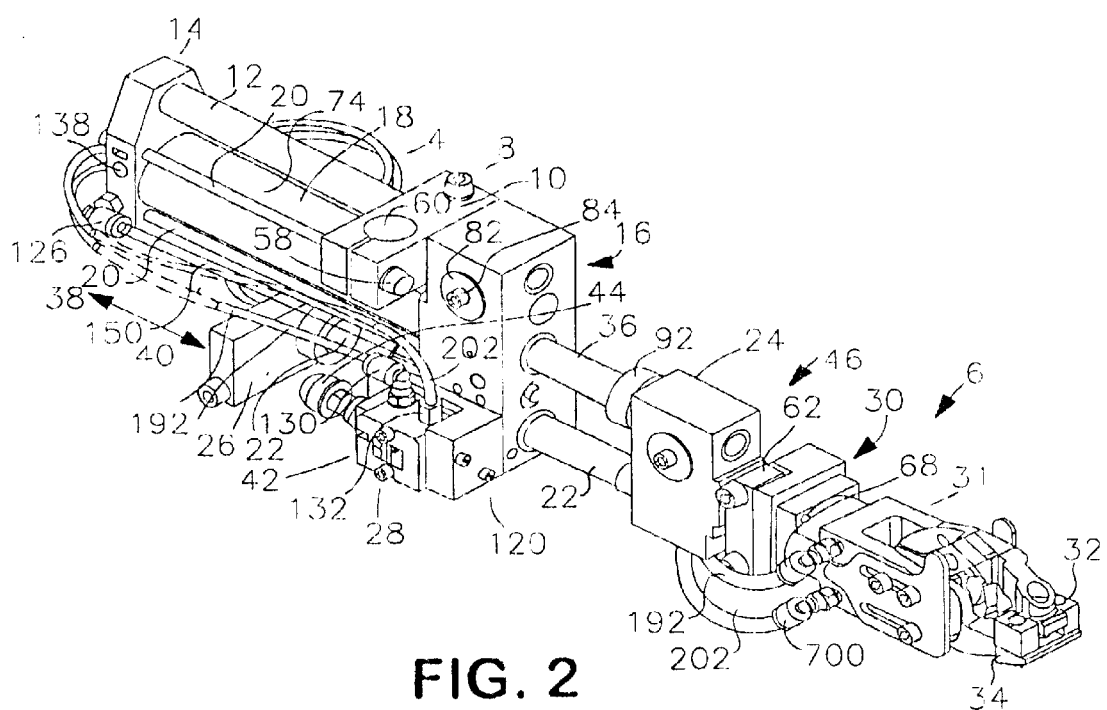
FIG. 2 is another perspective view of the linear slide gripper assembly of FIG. 1.

As shown in FIG. 2, slide assembly 4 extends gripper assembly 6 therefrom. Illustratively, extension rod 22 and piston rod 36 are both attached to mounting block 24. Piston rod assembly 18, of which piston rod 36 is a part, extends and retracts same to extend or retract gripper assembly 6. In addition, as gripper assembly 6 extends or retracts, block 26, which is shown attached to extension rod 22, moves concurrently in directions 38 and 40 to selectively engage switch 42 of switch assembly 28. It is contemplated that when block 26 engages switch 42, fluid, illustratively air, will be directed from switch assembly 28 to the gripper assembly 6 to selectively open or close gripper jaws 32 and 34. It is appreciated however, that the power of such actuators to the recited assemblies may be hydraulic, pneumatic, etc.

Figure 3:
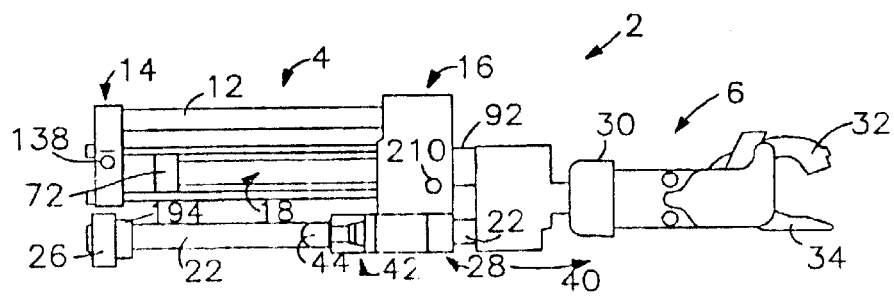
FIGS. 3 through 8 show an illustrative progression of movement of the slide assembly and the gripper assembly portions of the linear slide gripper assembly of FIG. 1.
Figure 4:
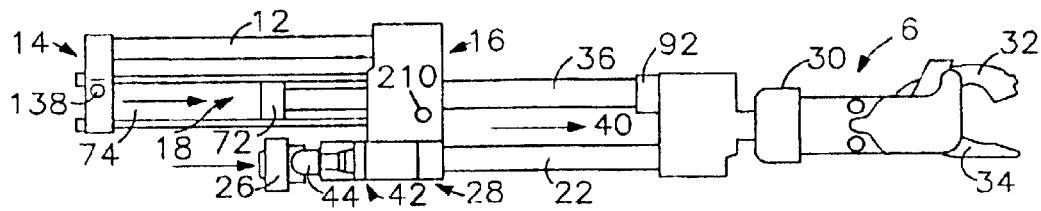
Figure 5:
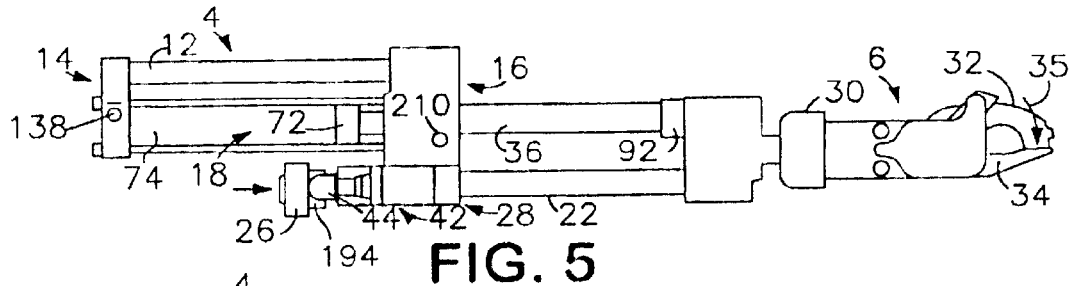
Figure 6:
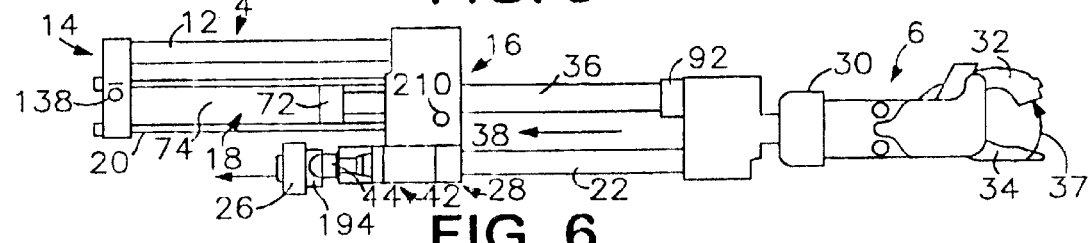
Figure 7:
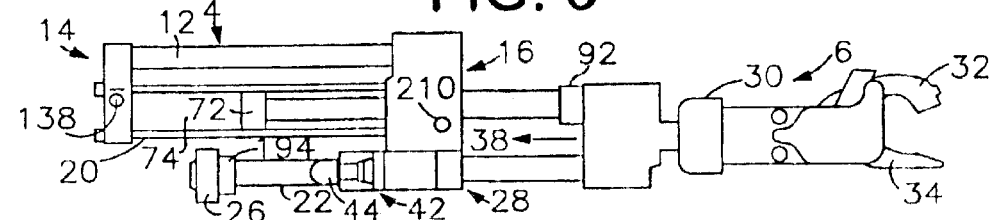
Figure 8:
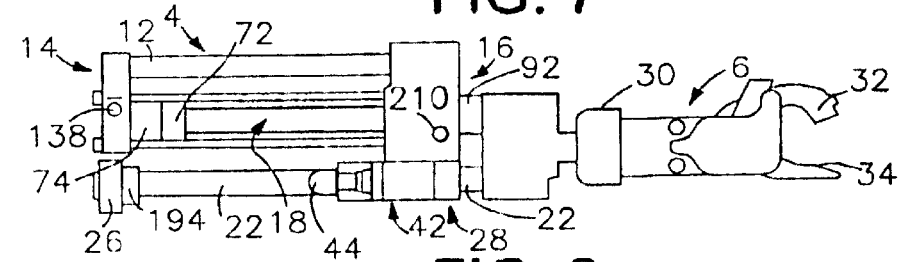

In one illustrative embodiment, as shown in FIGS. 3 through 8, the linear slide assembly 2 extends and retracts gripper assembly 6 such that at a certain point of extension the gripper jaws 32, 34 of gripper assembly 6, are caused to open. And conversely, during the retraction process, gripper jaws 32, 34 are caused to close and the gripper assembly 6 is retracted. As FIG. 3 illustratively shows, jaw members 32, 34 are in the open position as power is supplied to assembly 18 so that slide assembly 4 begins moving gripper assembly 6 in direction 40. As FIG. 4 illustratively shows, when gripper assembly 6 reaches a certain length of extension, block 26 engages the switch head 44 of switch assembly 42. Upon engagement of block 26 and head 44, gripper jaws 32, 34 are caused to close as indicated by directional arrow 35 in FIG. 5. In the illustrative embodiment, as slide assembly 2 causes gripper assembly 6 to retract, the disengagement of block 26 and switch head 44 will cause gripper jaws 32, 34 to open, as indicated by directional arrow 37 in FIG. 6. As both FIGS. 7 and 8 show, as gripper assembly 6 is continuing to move in the retracted direction 38, gripper jaws 32, 34 remain in the open position. It is appreciated that the particular operative progression of movement of assembly 2, shown in FIGS. 3 through 8, is intended as only one embodiment used for illustrative purposes. It is contemplated that the assemblies disclosed herein may cause a gripper of any type to have jaws open or close either during extension or during retraction, or before or after extension or retraction, depending on the needs of the operator. In addition, it is contemplated that other switch mechanisms that operate to activate the gripper assembly can be used.

Figure 9:
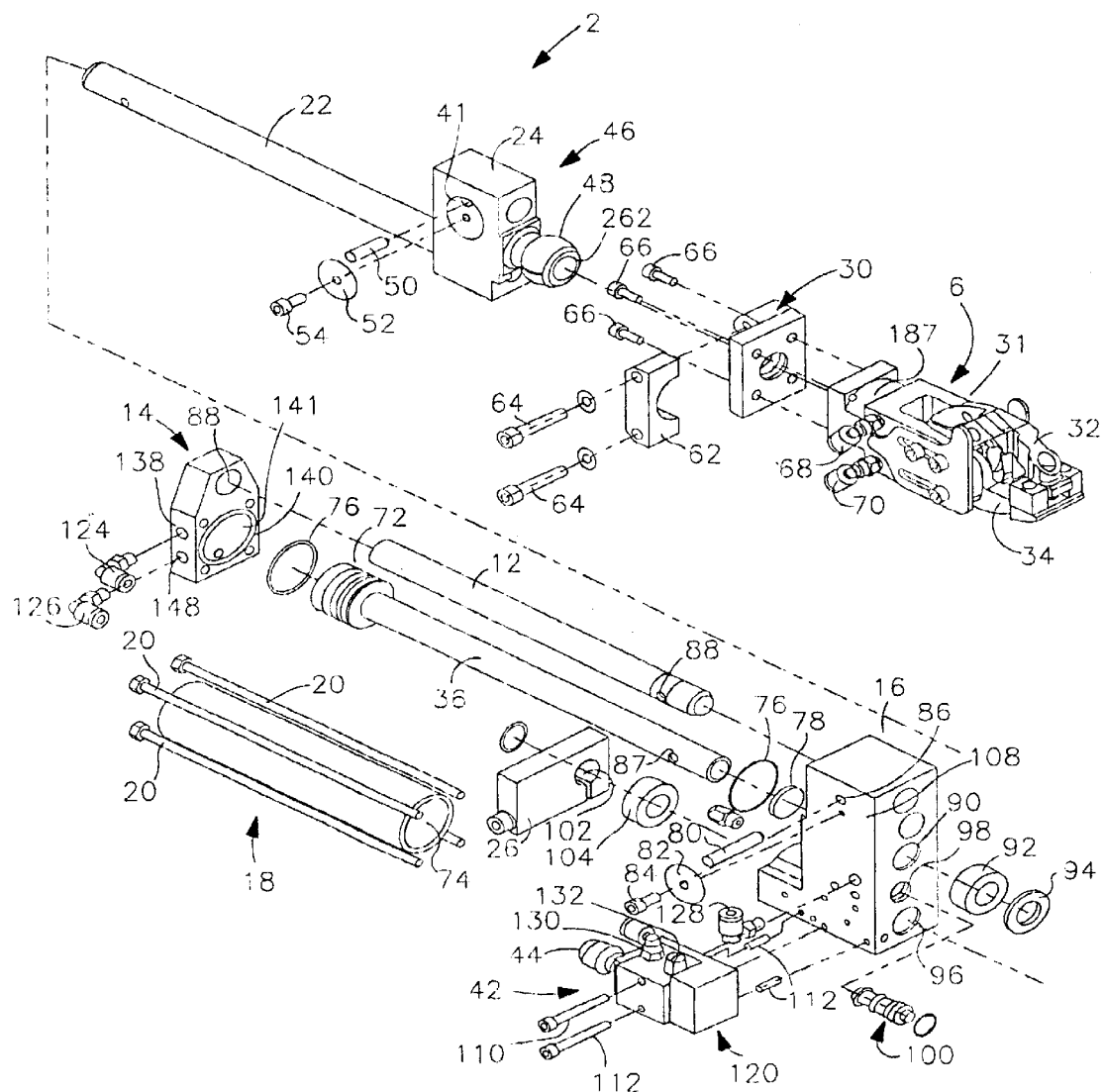
FIG. 9 is an exploded view of the linear slide gripper assembly of FIG. 1.

An exploded view of linear slide gripper assembly 2 is shown in FIG. 9. A mount assembly portion 46 of linear slide gripper assembly 2 comprises housing 16 with attached extension rod 22 extending therefrom. A partially-spherical mounting head 48 which couples to mounting bracket 30 illustratively extends opposite extension tube 22. A release dowel 50 disposes through a bore 41 which illustratively extends the width of mounting block 34. In the illustrated embodiment, piston rod 36 is disposed in mounting block 24 such that dowel 50 extends through both bore 41 in block 24, and bore 87 in piston rod 36 to secure the same to mounting block 24. Attachment and detachment of assembly 2 to and from mount assembly 8 is thereby eased with dowel pin 50 being easily removable by sliding the same out of bore 87 and at least a portion of bore 41. Dowel pin 50 is secured into place by a fastener 54 and cover plate 52, as shown in FIGS. 1 and 2.

It is further contemplated, as shown in FIG. 10, that mount block 10 can be attached to mount tube 12 via fastener 56 and can be attached to any comparable device, illustratively, another mounting tube 58 that is shown disposed through bore 60 of block 10, and is secured into place by fastener 59. Referring back to FIG. 9, gripper assembly 6 is attached to mounting assembly 46 by mounting bracket 30. In the illustrative embodiment, a clamp bracket portion 62 is configured to couple with bracket 30 onto mounting head 48, and fastened into place via fasteners 64 disposed through bores 250, 252 of brackets 30, 62, respectively. (See FIGS. 15 through 19.) In addition, gripper assembly 6 attaches to bracket 30 via fasteners 66. Gripper assembly 6 also shows port fittings 68 and 70 that are in fluid communication with the actuator (not shown) which powers the jaw members 32, 34, as known by those skilled in the art.

Figure 15:
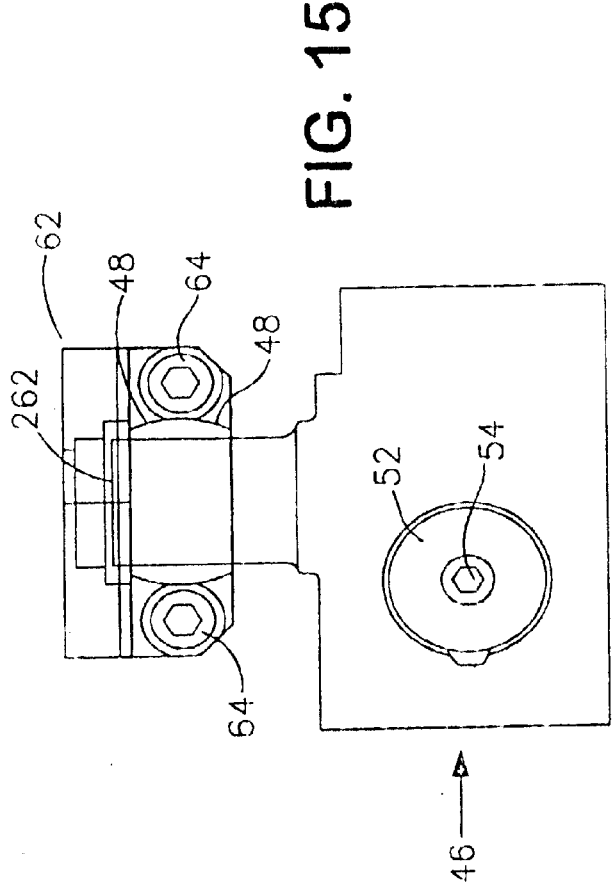
FIG. 15 is a side view of a mounting assembly portion of the linear slide gripper assembly of FIG. 1.
Figure 17:
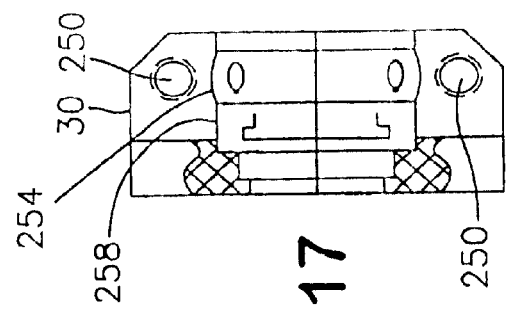
FIG. 17 is a side view of the mounting bracket portion of FIG. 16.
Figure 16:
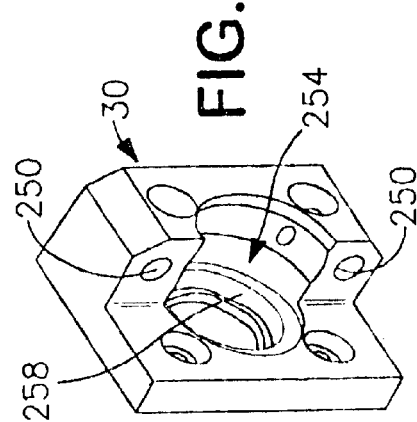
FIG. 16 is a perspective view of a mounting bracket portion of the linear slide gripper assembly of FIG. 1.
Figure 19:
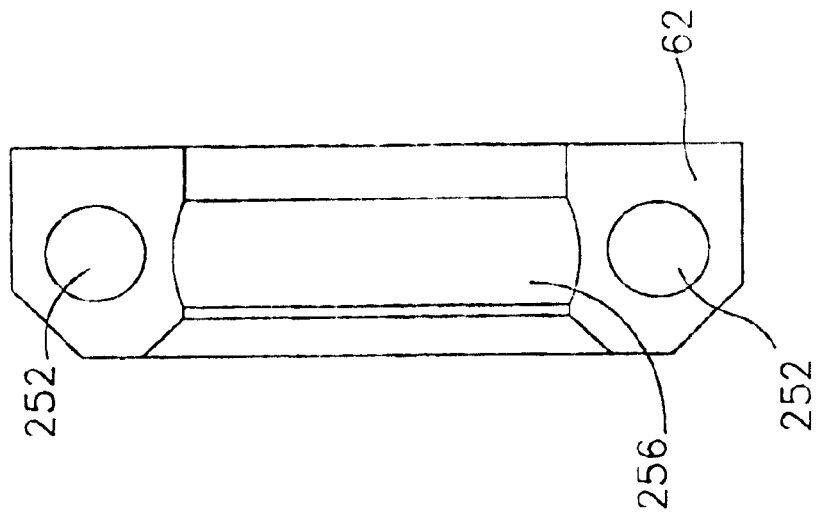
FIG. 19 is a side view of the clamp bracket portion of FIG. 18.
Figure 18:
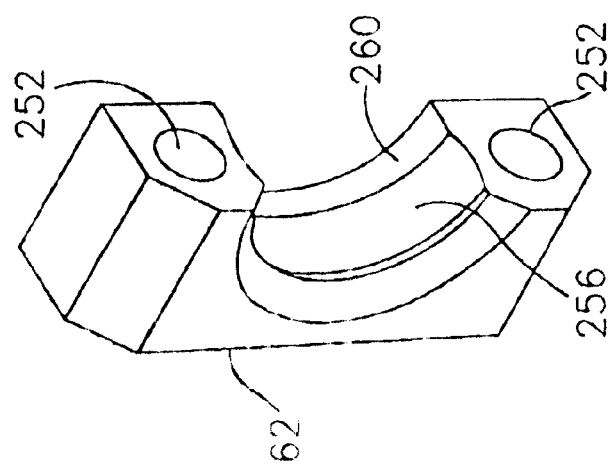
FIG. 18 is a perspective view of a clamp bracket portion of the linear slide gripper assembly of FIG. 1.

In the illustrative embodiment, bracket 30 and clamp bracket portion 62 each have a partially-spherical bore portions 254, 256, respectively, that correspond to partially-spherical mounting head 48, thus allowing semi-spherical movement about mount head 48 to selectively adjust the position of gripper assembly 6, as shown in FIG. 15. It is appreciated that because gripper assembly 6 is independent of piston rod 36, a mounting bracket of any type can be used to attach gripper assembly 6 or any other type of gripper to assembly 2 without piston rod 36 being required to actuate the gripper jaws, as is the case in the prior art. In addition, bracket 30 and clamp bracket portion 62 each have a cylindrical portion 258, 260, respectively, that corresponds to a cylindrical tip 262 of mounting head 48. This acts as a quick center so that an operator can easily reposition the gripper assembly 6 coaxially relative to assembly 2, as shown in FIGS. 1 and 2, without any additional measuring or calculations required.

Piston rod assembly 18 of slide assembly 4 is also shown in FIG. 9, comprising a piston 72 coaxially attached to piston rod 36 which is contained in cylinder 74, thereby defining a typical piston actuator. A plurality of sealing rings 76 and 78 are illustratively coaxially aligned with tube 74 and piston rod 36, and are positioned between assembly 18 and cap 14 and housing 16 to maintain the fluid within the cylinder assembly as known by those skilled in the art. It is, thus, contemplated that as fluid, such as air, is provided to one side of piston 72, piston rod 36 will move in one direction and, conversely, as fluid is directed to the opposite side of piston 72, piston rod 36 will concurrently move in the opposite direction.

As also shown in FIG. 9, housing 16 comprises dowel 80, cover plate 82, and fastener 84. Similar to dowel 50, plate 52 and fastener 54, as discussed relative to mounting assembly 46, dowel 80 extends through a bore 86 that is disposed through housing 16, and a bore 88 disposed through mounting tube 12 to secure same to housing 16. In addition, tube 12 also extends into bore 88 of cap 14, thereby securing mounting tube 12 to slide assembly 4.

Figure 22:
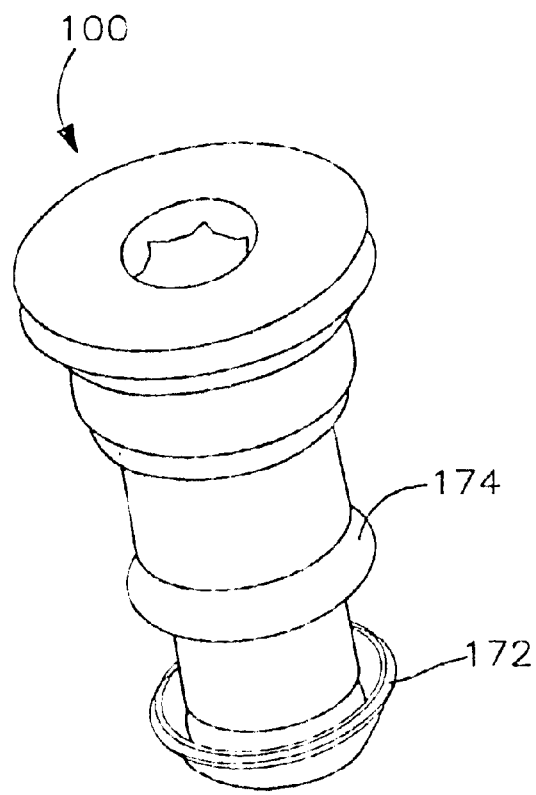
FIG. 22 is a perspective view of a check valve portion of the linear slide gripper assembly of FIG. 1.

In the illustrated embodiment, piston rod 36 extends through a bore 90 that is disposed through housing 16 as well as illustratively extending through shock pad 92 and shock washer 94. Illustratively, pad 92 and washer 94 cushion any impact made between mounting assembly 46 and slide assembly 4. In addition, housing 16 comprises a bore 96 configured to receive extension rod 22, as well as a bore 98 configured to receive the illustrative check valve 100, as shown in FIG. 9. (See also FIG. 22.) Regarding extension rod 22, block 26 has a bore 102 configured to receive rod 22, and a shock pad 104 disposed about rod 22 so that any force created by the impact between rod 22, or even block 26 and housing 16, is absorbed.

As further shown in FIG. 9, switch assembly 28 is attached to face 108 of housing 16 via fasteners 110, and, illustratively, guide pins 112 that fit into corresponding bores 114 and 116, respectively. In the illustrated embodiment, switch assembly 28 comprises a valve body 120 that is attached to switch 42. Switch 42 is so configured on housing 16 such that switch head 44 can selectively engage block 26. Also shown in FIG. 9 are port fittings 124, 126, 128, 130, 132, and 134. Fluid from a fluid source, e.g., pressurized air, is selectively directed to either fitting 124 via a tube 125 that is disposed in cap 14, or the fluid is selectively directed to fitting 128 of housing 16 via tube 127. When air is directed into fitting 124, it is distributed in cap 14, as discussed hereinafter, and exits through fitting 126 which is in fluid communication via tube 150 to fitting 134 which directs the fluid into housing 16. (See FIGS. 1, 2, and 12A, B.) Fittings 130 and 132 are in fluid communication with fittings 68 and 70 via tubes 192, 202, respectively. Fluid is directed from the switch assembly 28 into the gripper assembly 6 to power the actuator which moves jaws 32 and 34.

A detailed side and face view of cap 14 is shown in FIGS. 11A and B. In the illustrated embodiment, cap 14 has an extension bore 138 disposed therein which extends into a cylinder channel 140. In this illustrated embodiment, fluid is directed through fitting 124 and bore 138 which is coupled thereto and exiting at opening 142 into cylinder channel 140. Additionally, an opening 146 is also disposed in surface 141 that leads to bore 148. Bore 148 is coupled to fitting 126 through which the fluid is also directed out through tube 150. Accordingly, as fluid enters extension bore 138, it supplies fluid to the cylinder 74 which powers piston 72, moving same in direction 38. In addition, the fluid is directed out through opening 146 of surface 141 and through bore 148, fitting 126, and through tube 150 which is coupled to fitting 134, making the fluid in bore 148 in communication with bore 152 of housing 16. (See, also, FIGS. 12A and B.) This distribution allows the fluid source to power both the slide and gripper mechanisms. Also shown in FIG. 11B, are bores 158 through which tie bars 20 extend to assist securing cap 14 and housing 16 together. In addition, specifically regarding channel 140 in the illustrative embodiment, its perimeter is stepped, as indicated by reference numerals 160 and 162, so as to accommodate the sealing rings 76, as shown in FIG. 9.

Figure 12B:
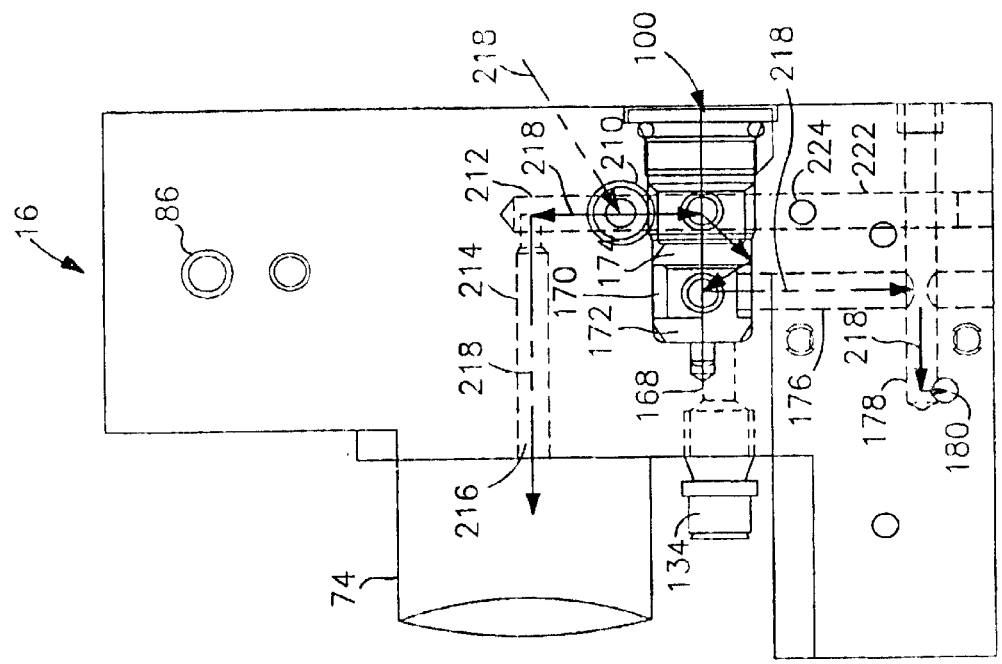
FIGS. 12A and B are both side views of a housing portion of the linear slide gripper assembly of FIG. 1, showing inner detail of the housing in phantom.
FIG. 12C is an underside view of the housing portion of FIGS. 12A and B showing inner detail of the housing in phantom.
FIG. 12D is a forward view of the housing portion of FIGS. 12A and B showing inner detail of the housing in phantom.
Figure 12A:
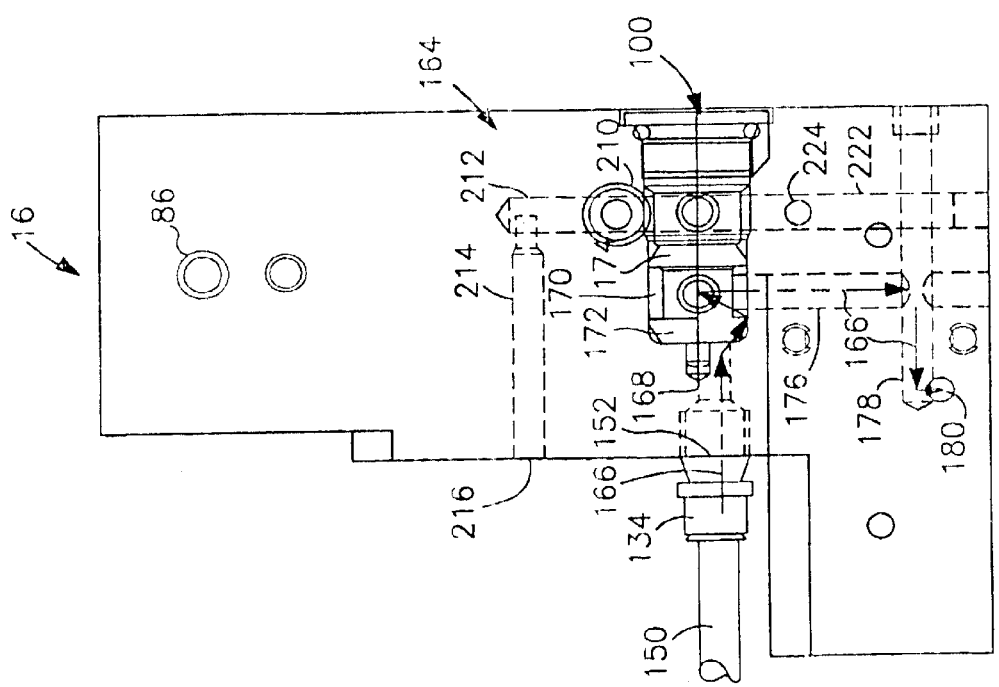

The fluid distribution system 162 of housing 16 is shown in FIGS. 12A through D. In the illustrative embodiment, fluid that is distributed from channel 140 exits bore 148 and through tube 150 and into fitting 134, and ultimately depositing into port 152. Port 152 then directs fluid as indicated by reference numeral 166 through passage 168 into cavity or chamber 170. As also shown in FIGS. 12A and B, chamber 170 contains check valve 100. In this illustrated embodiment, the fluid flow 166 is directed past a first valve member 172, thereby collecting fluid within chamber 170. Fluid is prevented from escaping by virtue of valve member 172 and valve member 174, being unidirectional valves as shown. Illustratively, fluid from chamber 170 deposits into conduits 176 and 178 which extend to opening 180.

Figure 13:
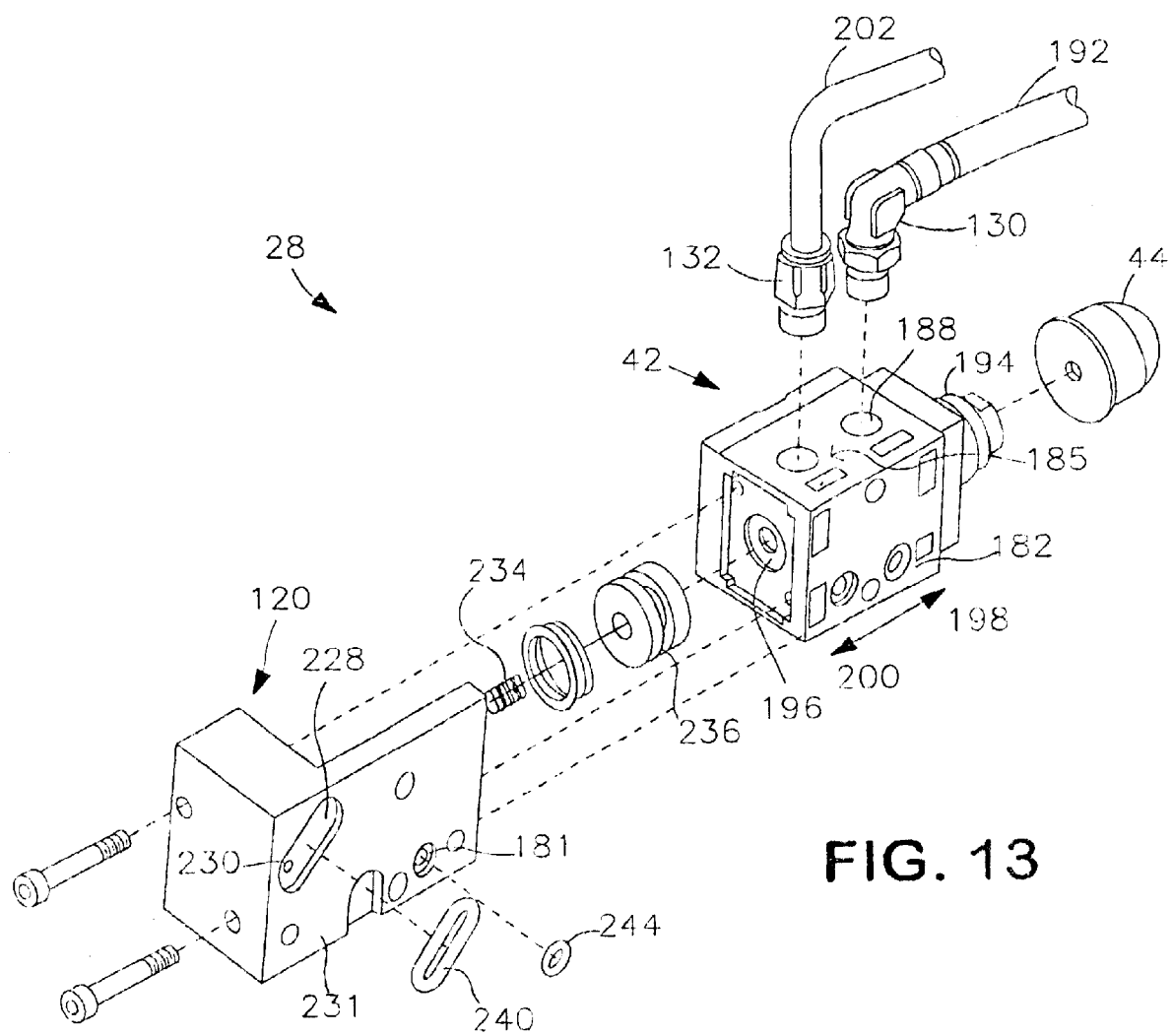
FIG. 13 is an exploded perspective view of a switch assembly portion of the linear slide gripper assembly of FIG. 1.

In the illustrated embodiment, switch assembly 28 is shown in exploded view in FIG. 13, wherein opening 180 of housing 16 is in fluid communication with opening 181 of valve body 120, which itself is in communication with opening 182 where it is collected in a cavity or chamber 185 of switch 42 when these structures are attached together. In the illustrated embodiment, fluid traveling in the direction indicated by referenced numeral 166 (see FIG. 11A) exits opening 180 and enters switch 42 via openings 180 and 182 into chamber 185. In this illustrative embodiment, when switch head 44 activates switch 42, which is illustratively a conventional spool 196, the fluid will be released from either openings 188 or 190 which are each attached to corresponding fittings 130 and 132, respectively. For example, when fluid from extension fitting 124 enters cap 14, and is directed through bore 148 and tube 150 into passage 168 of housing 16 and through check valve 100 in chamber 170, then out through conduits 176 and 178 through opening 181 and 182. When switch head 44 activates switch 42, the fluid is directed from chamber 185 through opening 188 and fitting 130 and, subsequently, through tube 192 which extends into fitting 68 where the fluid is then directed to an actuator 187 to power gripper jaws 32 and 34 to close same. As shown in FIG. 13, switch head 44 is attached to switch member 194 that is engagable with spool 196 which, in this illustrative embodiment, is moveable in directions 198 and 200. Thus, in this illustrative embodiment, when switch head 44 moves switch member 194 in direction 200, thus moving spool 196 in direction 200 as well, the fluid within chamber 185 of switch 42 is directed through opening 188 to close the jaw members 32, 34. Conversely, if spool 196 is moved in direction 198, the fluid in chamber 185 of switch 42 will be directed through opening 190 and, consequently, through port 132 to tube 202 into which is connected fitting 70 on gripper assembly 6 which will cause the actuator in assembly 6 to open gripper jaws 32, 34.

Thusly, in this illustrated embodiment, when fluid is provided into extension port 124, that fluid enters cap 14 through bore 138 providing fluid and, thus, power in cavity 140 to power piston 72, moving same in direction 40 while concurrently that fluid is being distributed through bore 148 in cap 14 out through tube 150 into passage 168 of housing 16 through the check valve 100, as previously described, out opening 180 and into valve body 120 through opening 181 and into switch 42 through opening 182. As piston 72 travels in direction 40, as does piston rod 36, the gripper assembly 6 is also caused to move in direction 40. Again, attached to gripper assembly 6 is mounting assembly 46 which includes extension rod 22 with block 26 attached thereto which can be positioned such that at the end of the desired stroke in direction 40, block 26 is made to engage switch head 44 which causes movement of switch head 44, switch member 194, and subsequently, spool 196 to move in direction 200 which releases the fluid that has collected in switch 42 to exit through opening 188, fitting 130, the attached tube into fitting 68 and, subsequently, directed into the actuator 187 that powers gripper assembly 6 to close gripper jaws 32, 34. The net effect being that gripper assembly 6 is extended a certain distance in direction 40, and when that certain distance has been reached, as can be shown by the progression of FIGS. 3 through 5, the gripper jaws 32, 34 close.

In the illustrative embodiment, to open jaw members 32, 34 and retract gripper assembly 6, as shown by the progression of FIGS. 6 through 8, the fluid source ceases supplying fluid to tube 125, and rather, supplies fluid to tube 127 which is in fluid communication with fitting 128 and bore 210 disposed through the surface of housing 16. As shown in FIGS. 12B and 12D, bore 210 is in fluid communication with conduit 212, illustratively running transverse to bore 210. Conduit 212, as shown specifically in FIG. 12B, is in fluid communication with conduit 214 which leads to opening 216.

Figure 20:
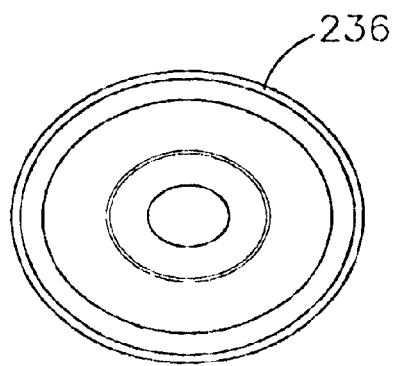
FIG. 20 is a front view of a valve assembly piston of the linear slide gripper assembly of FIG. 1.
Figure 21:
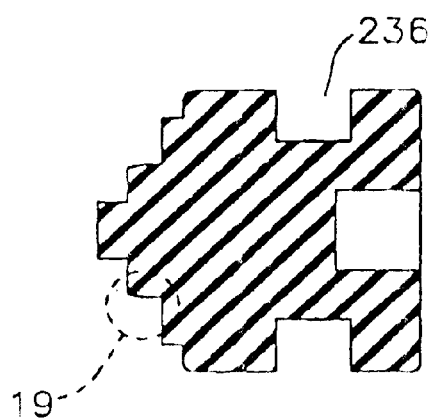
FIG. 21 is a side cross-sectional view of the valve assembly piston of FIG. 20.

In the illustrated embodiment, fluid is directed into bore 210 as indicated by reference number 218, wherein that fluid is further directed into conduit 212 where the fluid is further distributed into conduit 214 and into chamber 170 from conduit 220. (See FIG. 12D.) The fluid is also distributed into conduit 222 which leads to opening 224. The fluid that is distributed through conduit 214 and out opening 216 is used to power piston 72, moving same in direction 38. Specifically, opening 216 is aligned with cylinder 74, directing fluid indicated by directional arrow 218 to be deposited into cylinder 74. Fluid deposited in piston cavity 223 of cylinder 74 causes piston 72 to displace and move in direction 38. Concurrently, fluid is directed into conduit 220 which is in fluid communication with chamber 170 such that the fluid passes through valve member 226 of check valve 100, as shown in FIG. 12B. This fluid is then directed through conduits 176 and 178 and further directed out opening 180 and, subsequently, openings 181 and 182 to deposit into switch assembly 42, similar to that described previously in relation to the fluid being supplied during extension of the gripper assembly. In addition, fluid is directed through conduit 222 which exits from opening 224. This fluid is directed to cavity 228 that is disposed in surface 231 of valve body 120. An opening 230 is disposed in cavity 228 which extends through valve body 120 and into a piston cavity 232 as shown in FIG. 14. The fluid supplied into piston cavity 232 assists spring member 234 to move piston 236 in direction 198. Piston 236 is configured to exert a force against spool 196 to also move spool 196 in direction 198 as well. (See, also, FIGS. 20 and 21.) The effect of moving spool 196 in direction 198 is to cause the fluid inside switch assembly 42 to be directed through opening 190 and, consequently, through fitting 132 and tube 202 which is in fluid communication with port 70 of gripper assembly 6. This supplies power to the actuator of gripper assembly 6, opposite of the power provided to close gripper jaws 32, 34, thus, causing gripper jaws 32, 34 to open. Also shown in FIG. 13 are gaskets 240 and 244 which line the periphery of cavity 228 and opening 181, respectively, to provide an air seal for same when positioned adjacent surface 108 of housing 16.

It is contemplated that in this illustrative embodiment, switch head 44 comprises a resilient body such that even if block 26 is preventing switch head 44 from moving in direction 198, the resiliency of the body will allow piston 236 to move spool 196 in direction 198, thereby compressing head 44 which allows the fluid inside switch assembly 42 to be directed through opening 190 without requiring block 26 to move. The effect of this configuration is that fluid which is supplied into fitting 128 and, thus, into opening 210 in housing 16 is such that the fluid is directed to power the piston 72 while, concurrently, it is also supplied to chamber 170 and 228, respectively, wherein the fluid is forcing the piston 236 in direction 198 to move spool 196 in direction 198 as well, thus, directing the flood out through hole 190 to tube 202 and into gripper assembly 6 to open the jaws, illustratively, before any appreciable retraction of gripper assembly in direction 38 occurs. The displacement of piston 72 as piston cavity 223 fills in cylinder 74 then moves piston 72 in direction 38, thereby retracting gripper assembly 6 as shown in FIG. 7. This continues, illustratively, until gripper assembly 6 has reached the end of its stroke as indicated in FIG. 8.

Although the present disclosure has been described with reference to particular means, materials and embodiments, from the foregoing description, one skilled in the art can easily ascertain the essential characteristics of the present disclosure and various changes and modifications may be made to adapt the various uses and characteristics without departing from the spirit and scope of the present invention as set forth in the following claims.

What is claim is:

1. A linear slide gripper assembly comprising:
   a linear slide assembly comprising:
      a slide having first and second receiving ports both in fluid communication with a fluid source to move the slide between extended and retracted positions;
      a valve assembly comprising a check valve located within a cavity;
      wherein both the first and second receiving ports are in communication with the check valve, and each direct a portion of the fluid through the valve and into the cavity;
      a switch having a chamber that is in fluid communication with the cavity;
   wherein upon activation of the switch the chamber becomes in selective communication with first and second conduits;
      a trip coupled to and movable with the slide;
      wherein movement of the slide causes the trip to activate the switch to release fluid from the switch; and
   a gripper assembly comprising:
      an actuator in fluid communication with the first and second conduits to receive the fluid released from the switch to power the actuator; and
      at least one gripper arm coupled to the gripper assembly;
      wherein the actuator is engagable with at least one of the arms and moves the arm when the actuator is powered by the fluid from the switch.

2. The linear slide gripper assembly of claim 1, wherein as the slide moves to a first position, the trip activates the switch which causes fluid in the chamber of the switch to be directed through the first conduit to power the actuator of the gripper assembly to move the at least one jaw arm.

3. The linear slide gripper assembly of claim 2, wherein the slide is movable from the first position to a second position such that the trip reactivates the switch to cause the fluid from the chamber of the switch to power the actuator of the gripper assembly to move the at least one jaw arm again.

4. The linear slide gripper assembly of claim 3, wherein the switch further comprises a resilient member that is compressible such that in a compressed state the switch is reactivated.

5. The linear slide gripper assembly of claim 4, wherein the second receiving part is in fluid communication with a valve actuator that exerts a force on the switch and against the trip thereby compressing the resilient member to reactivate the switch to release fluid from the chamber to the gripper assembly and move the at least one giipperjaw in the second direction.

6. A linear slide gripper assembly comprising:
   a linear slide assembly;
   wherein the linear slide assembly having a fluid passage configured to receive fluid from a fluid source; and
   wherein the linear slide assembly comprises a slide in fluid communication with the fluid passage to move the slide;
   a valve assembly in fluid communication with the fluid passage;
   a fluid actuated gripper assembly attached to, and movable with the slide, wherein the fluid actuated gripper assembly comprising:
      an actuator in fluid communication with the valve assembly;
      wherein the valve assembly selectively directs fluid from the fluid passage of the linear slide assembly to the actuator; and
      at least one jaw member that is powered by the actuator to selectively move the at least one jaw member relative to the gripper assembly.

7. The linear slide gripper assembly of claim 6, wherein the linear slide assembly further comprises an extension passage configured to receive fluid from the fluid source.

8. The linear slide gripper assembly of claim 7, wherein the slide is in fluid communication with the fluid from the extension passage to move the slide.

9. The linear slide gripper assembly of claim 8, wherein the linear slide assembly further comprises a retraction passage configured to receive fluid from the fluid source.

10. The linear slide gripper assembly of claim 9, wherein the slide is in fluid communication with the fluid from the retraction passage to move the slide.

11. The linear slide gripper assembly of claim 10 wherein the slide is movable between extended and retracted positions when fluid from the fluid source is selectively delivered to the extension and retraction passages.

12. A linear slide gripper assembly comprising:
   a linear slide assembly comprising:
      a slide;
      a valve;
      a fluid passage assembly configured to receive fluid from a fluid source;
      wherein the fluid passage assembly having a distribution port that directs the fluid to the slide and directs the fluid to the valve; and
      wherein force from the fluid moves the slide in a first direction;
   a fluid actuated gripper assembly coupled to the slide, wherein the fluid actuated gripper assembly comprising a switch in fluid communication with the valve;
      an actuator in fluid communication with the switch;
      wherein the switch selectively delivers fluid to the actuator; and
      at least one jaw member that is powered by the actuator to selectively move the at least one jaw member relative to the gripper assembly.

13. The linear slide gripper assembly of claim 12, wherein the switch is activated by movement of the slide.

14. The linear slide gripper assembly of claim 13, wherein the valve is located in a valve cavity where the fluid is collected.

15. The linear slide gripper assembly of claim 14, wherein activation of the switch delivers fluid from the fluid cavity to the actuator.

16. The linear slide gripper assembly of claim 15, wherein movement of the slide in the first direction is an extending direction.

17. The linear slide gripper assembly of claim 16, further comprising a trip member coupled to the slide such that movement of the slide in the extending direction causes the trip member to engage the switch to activate same to deliver fluid from the fluid cavity to the actuator.

18. The linear slide gripper assembly of claim 17, wherein the fluid passage assembly is an extension fluid passage assembly.

19. The linear slide gripper assembly of claim 18, wherein the linear slide assembly further comprises a retraction fluid passage assembly configured to receive fluid from the fluid source, wherein, the retraction fluid passage assembly having a distribution port that directs the fluid to the slide and directs the fluid to the valve, wherein force from the fluid moves the slide in a retracting direction, wherein movement of the slide in the retracting direction causes the switch to activate to deliver fluid from the fluid cavity to the actuator.

20. The linear slide gripper assembly of claim 19, wherein activation of the switch from movement of the slide in the retracting direction causes the at least one jaw arm of the actuated gripper assembly to move.

21. The linear slide gripper assembly of claim 20, wherein activation of the switch from movement of the slide in the extending direction delivers fluid to the actuator to close the at least one jaw member, and activation of the switch from movement of the slide in the retracting direction delivers fluid to the actuator to open the at least one jaw member.

22. A linear slide gripper assembly comprising:
a linear slide portion having one extension port and one retraction port both in fluid communication with a fluid source to move the linear slide portion between extended and retracted positions, respectively;
wherein the extension and retraction ports each direct a portion of the fluid through a valve; and
a gripper assembly in fluid communication with the fluid from the valve;
wherein the gripper assembly comprises at least one jaw member; and
wherein the fluid from the valve actuates the gripper assembly.

23. The linear slide gripper assembly of claim 22, wherein the valve is located in a space that collects fluid that is deposited from the extension and retraction ports.

24. The linear slide gripper assembly of claim 23, wherein the space is in communication with a switch that is in fluid communication with the gripper assembly such that activation of the switch transfers fluid collected in the space to gripper assembly.

25. The linear slide gripper assembly of claim 24, wherein movement of the linear slide portion activates the switch.

26. The linear slide gripper assembly of claim 25, wherein activation of the switch delivers fluid from the space to the gripper assembly.

27. The linear slide gripper assembly of claim 26, wherein fluid supplied to the extension port directs the portion of the fluid through the valve and into the space such that movement of the linear slide portion engages the switch to deliver fluid from the space to the gripper assembly.

28. The linear slide gripper assembly of claim 27, wherein fluid supplied to the retraction port directs the portion of the fluid through the valve and into the space such that movement of the linear slide portion engages the switch to deliver fluid from the space to the gripper assembly.

29. The linear slide gripper assembly of claim 28, wherein delivery of the fluid to the gripper assembly causes the gripper assembly to open.

30. The linear slide gripper assembly of claim 28, wherein the valve is a dual check valve that receives fluid from both the extension and retraction ports.

31. The linear slide gripper assembly of claim 30, wherein the switch is a pressure switch comprising a first chamber that receives fluid from the space and a second chamber that receives fluid from the space upon activation of the switch.

32. The linear slide gripper assembly of claim 27, wherein delivery of the fluid to the gripper assembly causes the gripper assembly to close.

33. The linear slide gripper assembly of claim 22, wherein the gripper assembly is semi-spherically movable relative the linear slide portion.

* * * * *